(12) United States Patent
Lowe et al.

(10) Patent No.: US 6,442,617 B1
(45) Date of Patent: Aug. 27, 2002

(54) METHOD AND SYSTEM FOR FILTERING MULTICAST PACKETS IN A PERIPHERAL COMPONENT ENVIRONMENT

(75) Inventors: Glen H. Lowe, Union City; Edmund Chen, Sunnyvale; Claude G. Hayek, Huntington Beach, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/282,311

(22) Filed: Mar. 31, 1999

(51) Int. Cl.⁷ .............................................. G06F 15/16
(52) U.S. Cl. ........................ 709/250; 709/200; 709/205; 709/227; 709/228; 713/201
(58) Field of Search ................................. 709/200–202, 709/223–224, 205, 227–228, 250; 713/201; 370/389–401

(56) References Cited

U.S. PATENT DOCUMENTS

| | | | |
|---|---|---|---|
| 5,473,607 A | * 12/1995 | Hausman et al. | 370/392 |
| 5,757,795 A | * 5/1998 | Schnell | 370/392 |
| 5,832,229 A | * 11/1998 | Tomoda et al. | 709/227 |
| 5,862,338 A | * 1/1999 | Walker et al. | 709/224 |
| 5,935,249 A | * 8/1999 | Stern et al. | 709/250 |
| 6,018,526 A | * 1/2000 | Liu et al. | 370/401 |
| 6,085,328 A | * 7/2000 | Klein et al. | 709/227 |
| 6,157,955 A | * 12/2000 | Narad et al. | 709/228 |
| 6,334,153 B2 | * 12/2001 | Boucher et al. | 709/250 |

* cited by examiner

*Primary Examiner*—Bharat Barot
(74) *Attorney, Agent, or Firm*—Wagner Murabito & Hao LLP

(57) ABSTRACT

A method and system for filtering multicast packets by a peripheral component. In one embodiment, the present invention uses a peripheral component driver to store in memory a selected hash values corresponding to desired multicast packets. In one embodiment, the peripheral component driver operates on a host computer to which a peripheral component is coupled. Next, when the peripheral component receives an incoming multicast packet, the present invention uses a hash value generator disposed on the peripheral component to determine a hash value for the received multicast packet. The present embodiment then compares the hash value for the received multicast packet with the selected hash values stored in memory. Provided the hash value for the received multicast packet does not match any of the selected hash values stored in the memory, the present embodiment discards the received multicast packet without interrupting the host computer. In so doing, the present embodiment effectively filters multicast packets without requiring constant intervention by the CPU (central processing unit) of the host computer.

19 Claims, 5 Drawing Sheets

METHOD AND SYSTEM FOR FILTERING MULTICAST PACKETS IN A PERIPHERAL COMPONENT ENVIRONMENT

TECHNICAL FIELD

The present invention generally pertains to the field of computer networking. More particularly, the present invention is related to multicast packet filtering in a peripheral component environment.

BACKGROUND ART

Computers have become an integral tool used in a wide variety of different applications, such as in finance and commercial transactions, computer-aided design and manufacturing, health-care, telecommunication, education, etc. Computers are finding new applications as a result of advances in hardware technology and rapid development in software technology. Furthermore, a computer system's functionality is dramatically enhanced by coupling stand-alone computers together to form a computer network. In a computer network, users may readily exchange files, share information stored on a common database, pool resources, and communicate via e-mail and via video teleconferencing.

One popular type of computer network is known as a local area network (LAN). LANs connect multiple computers together such that the users of the computers can access the same information and share data. Typically, in order to be connected to a LAN, a general purpose computer requires an expansion board generally known as a network interface card (NIC). Essentially, the NIC works with the operating system and central processing unit (CPU) of the host computer to control the flow of information over the LAN. Some NICs may also be used to connect a computer to the Internet.

The NIC, like other hardware devices, requires a device driver which. controls the physical functions of the NIC and coordinates data transfers between the NIC and the host operating system. An industry standard for interfacing between the device driver and the host operating system is known as the Network Device Interface Specification, or NDIS, which is developed by Microsoft Corporation of Redmond, Washington. The operating system layer implementing the NDIS interface is generally known as an NDIS wrapper. Functionally, the NDIS wrapper arbitrates the control of the device driver between various is application programs and provides temporary storage for the data packets.

Multicasting of packets in well known in the field of computer networking. A multicast packet is packet which is intended for receipt by more than one recipient. However, multicast packets, and the receipt thereof, can have a deleterious effect on many computer systems. Specifically, as the number of multicast packets continually increases, recipients (e.g. client computer systems) are forced to spend more and more time examining received multicast packets and determining whether or not they are wanted. That is, even when not requested, received multicast packets require intervention by the recipient. Thus, the recipient is often forced to store the multicast packet; examine the multicast packet; and the discard the multicast packet (when the multicast packet is unwanted) or keep the multicast packet (when the multicast packet is desired). Hence, considerable CPU (central processing unit) utilization can be wasted by receiving and handling unwanted multicast packets. Such wasted CPU utilization is especially prevalent in some conventional peripheral component environments. More specifically in some conventional peripheral component environments, the peripheral component is forced to frequently interrupt the host computer to forward received multicast packets. Therefore, as network speeds increase (e.g. Gigabit Ethernet and the like), peripheral component interruptions of the host computer, due to received multicast packets, become a significant source CPU drain.

In one attempt to reduce the CPU burden imposed by multicast packets, a filter is employed. In one such approach, referred to as a "perfect" filter system, the host computer (e.g. a driver operating thereon) constructs a list of desired destination addresses corresponding to respective multicast packets which the host computer wants to receive. Whenever a multicast packet is received, its destination address is compared to the previously constructed list of desired destination addresses. If the destination address of the received multicast packet is contained the list of desired destination addresses, the multicast packet is kept. On the other hand, if the destination address of the received multicast packet is not contained in the list of desired destination addresses, the multicast packet is discarded. Thus, by requiring the host computer to list each and every desired destination address, such prior art methods require extensive host computer intervention.

There are additional substantial drawbacks to conventional "perfect" filtering methods. As one example, there are $2^{47}$ potential destination addresses for multicast packets. Therefore, storing all desired multicast addresses potentially consumes a burdensome amount of storage space. That is, constructing a table containing as many as $2^{47}$ desired destination addresses can exhaust an inordinate amount of valuable memory space.

Thus, a need exists for a method and system for filtering multicast packets wherein the method and system does not require extensive host computer intervention. Still another need exists for a method and system for filtering multicast packets wherein the method and system meets the above-listed need and wherein the method and system does not consume burdensome amounts of storage space. Yet another need exists for a method and system for filtering multicast packets wherein the method and system meets the above-listed needs and wherein the method and system does not require extensive modifications to underlying peripheral component driver protocols.

DISCLOSURE OF THE INVENTION

The present invention provides a method and system for filtering multicast packets wherein the method and system does not require extensive host computer intervention. The present invention further provides a method and system for filtering multicast packets wherein the method and system achieves the above-listed accomplishment and wherein the method and system does not consume burdensome amounts of storage space. The present invention also provides a method and system for filtering multicast packets wherein the method and system achieves the above-listed accomplishments and wherein the method and system does not require extensive modifications to underlying peripheral component driver protocols.

Specifically, in one embodiment, the present invention uses a peripheral component driver to store in memory a selected hash values corresponding to desired multicast packets. In one embodiment, the peripheral component driver operates on a host computer to which a peripheral component is coupled. Next, when the peripheral component receives an incoming multicast packet, the present invention uses a hash value generator disposed on the peripheral component to determine a hash value for the received multicast packet. The present embodiment then compares the hash value for the received multicast packet with the selected hash values stored in memory. Provided the hash value for the received multicast packet does not match any of the selected hash values stored in the memory, the present embodiment discards the received multicast packet without interrupting the host computer. In so doing, the present embodiment effectively filters multicast packets without requiring constant intervention by the CPU (central processing unit) of the host computer.

In another embodiment, the present invention includes the features of the above-listed embodiment and further recites that the hash value generator produces a 10 bit hash value. In so doing, the present embodiment is able to generate up to 1024 hash values which, in turn, can be compared to 1024 selected hash values corresponding to at least 1024 desired multicast packets.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
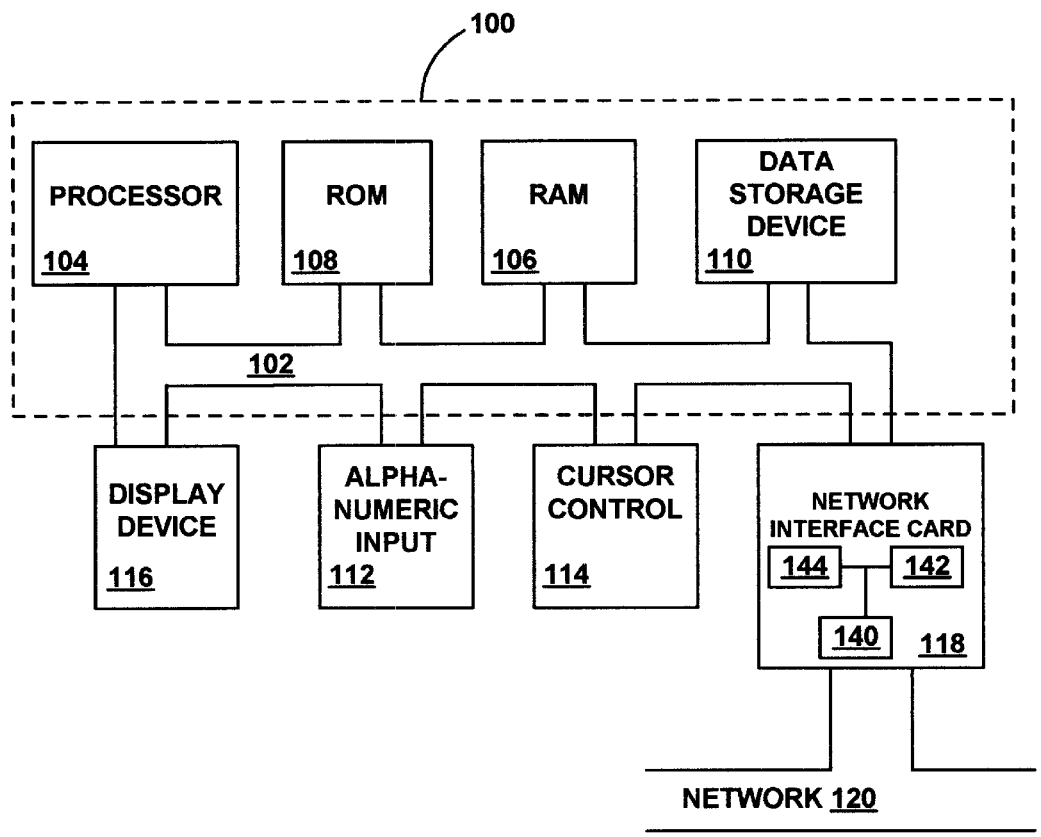
FIG. 1 is a schematic diagram of an exemplary computer system used to perform steps of the present imperfect filtering of multicast packets method in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing", "determining", "comparing", "discarding", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT IMPERFECT FILTERING OF MULTICAST PACKETS INVENTION

With reference now to FIG. 1, portions of the present hardware assisted polling for software drivers method and system are comprised of readable and computer-executable instructions which reside, for example, in computer-usable media of a computer system. FIG. 1 illustrates an exemplary computer system 100 used to perform the imperfect filtering of multicast packets method in accordance with one embodiment of the present invention. It is appreciated that system 100 of FIG. 1 is exemplary only and that the present invention can operate within a number of different computer systems including general purpose networked computer systems, embedded computer systems, and stand alone computer systems.

System 100 of FIG. 1 includes an address/data bus 102 for communicating information, and a central processor unit 104 coupled to bus 102 for processing information and instructions. Central processor unit 104 may be an 80×86- family microprocessor. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage unit 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 1, optional display device 116 of FIG. 1, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands. A more detailed discussion of the imperfect filtering of multicast packets method and system embodiments of the present invention are found below.

With reference still to FIG. 1, significantly, a network interface card (NIC) 118 coupled to bus 102 is connected to a network 120 and controls the flow of information over network 120. Data packets, such as Ethernet packets, that are incoming arrive at NIC 118 via network 120 and are stored in memory 140 of NIC 118 before being transferred to other hardware and software of computer system 100. Memory 140 of NIC 118 is also well suited to storing, for example, selected hash values (generated by host computer 100) corresponding to desired multicast packets. It will be understood, that NIC 118 is also well suited to transmitting data packets to network 120. NIC 118 of FIG. 1 further includes a hash value generator 142, and a comparator 144. A more detailed discussion of NIC 118 in furtherance of the present invention is found below.

Figure 2:
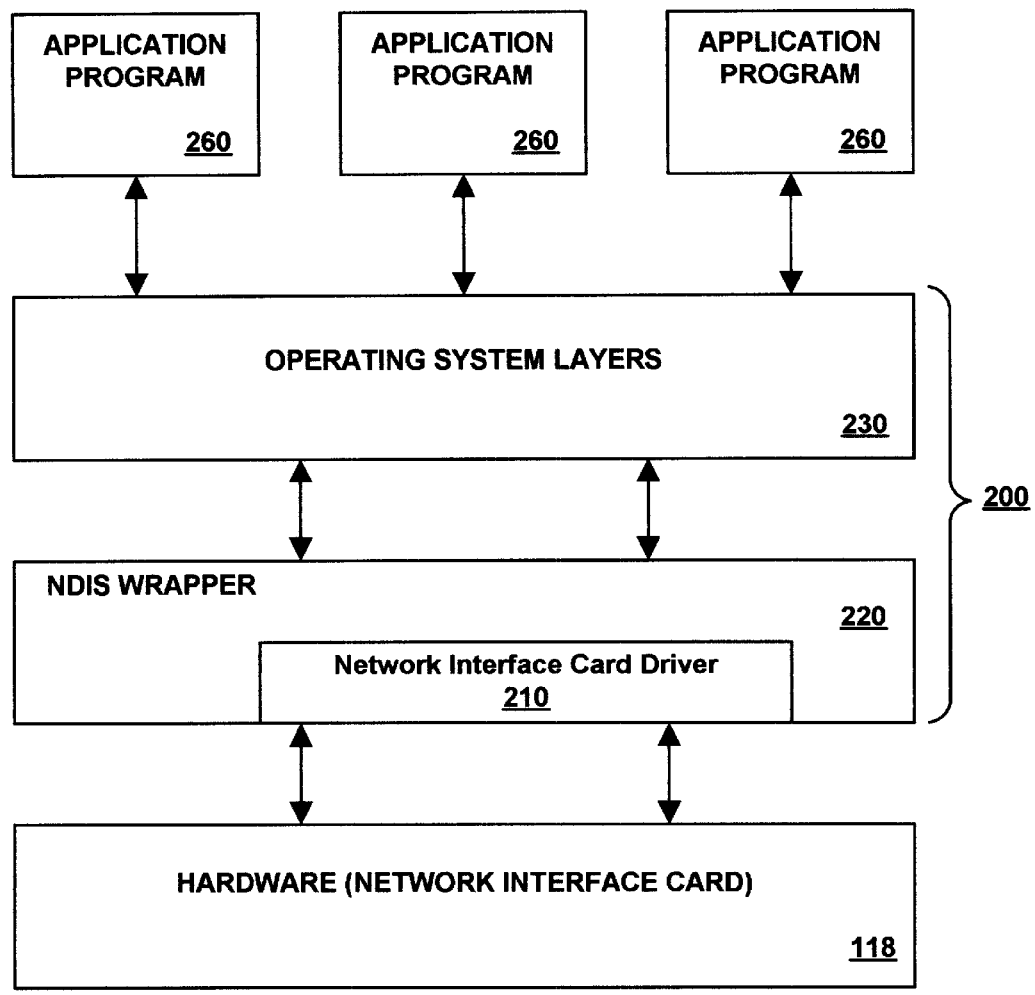
FIG. 2 is a schematic diagram of different operating layers associated with the computer system as illustrated in FIG. 1 in furtherance of one embodiment of the present invention.

Referring next to FIG. 2, a block diagram that represents the different layers of a host operating system 200 operable on computer system 100 of FIG. 1 is shown. Host operating system 200 includes a network interface card driver 210 that operates NIC 118 and moves data packets between NIC 118 and other hardware and software of computer system 100. Implemented directly above network interface card driver 210 is a network device interface specification (NDIS) wrapper 220. FIG. 2 further includes a schematic representation of operating system layers 230. NDIS wrapper 220 primarily arbitrates the control of network interface card driver 210 between various application programs, typically shown as 260.

GENERAL DESCRIPTION OF THE PRESENT IMPERFECT FILTERING OF MULTICAST PACKETS INVENTION

Figure 3:
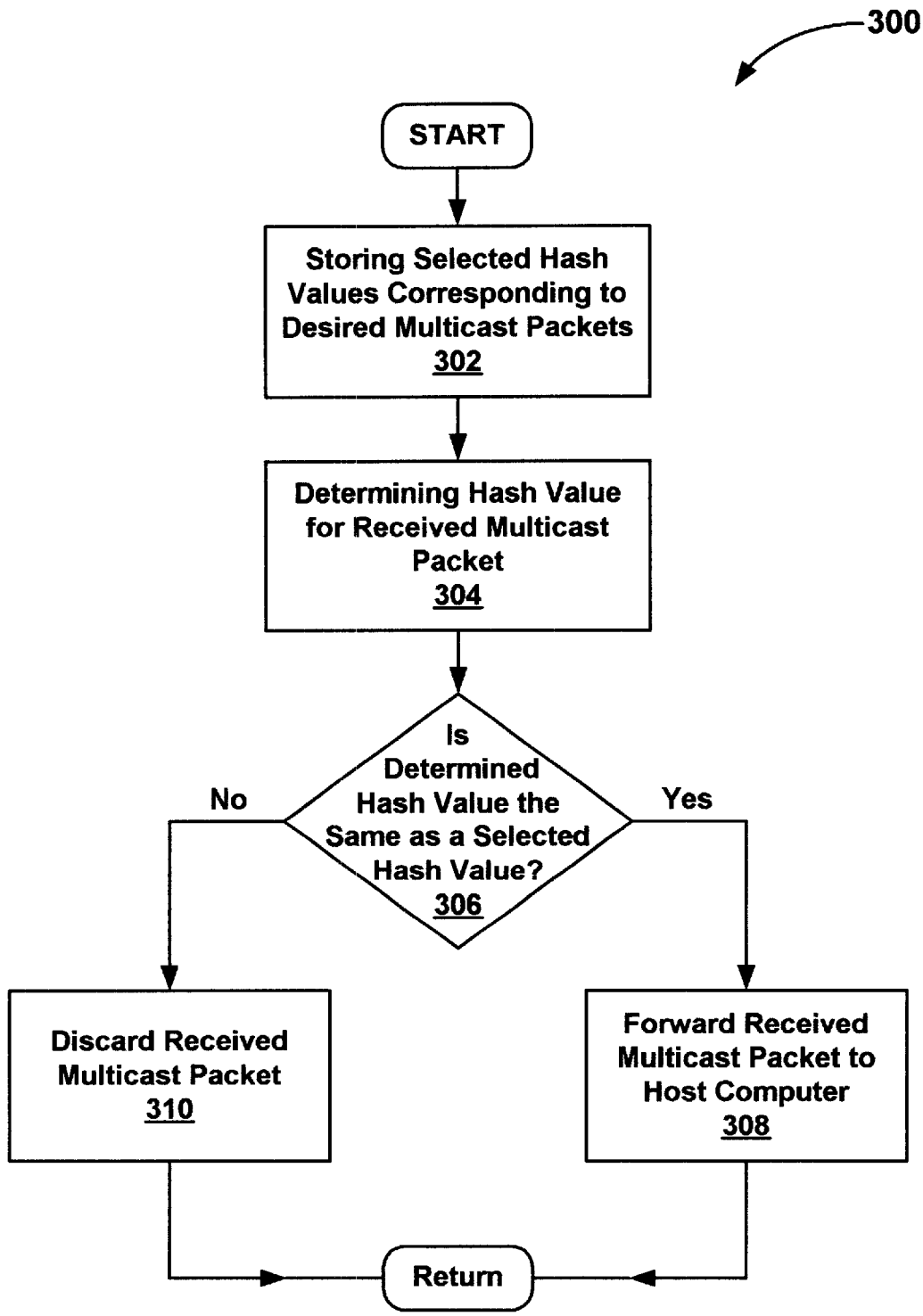
FIG. 3 is a flow chart of steps performed in one implementation of an imperfect filtering of multicast packets method and system in accordance with one embodiment of the present claimed invention.

With reference next to FIG. 3, an flow chart 300 of exemplary steps used by the present invention is shown. Flow chart 300 includes processes of the present invention which, in one embodiment, are carried out by a processor under the control of computer-readable and computer-executable instructions. The computer-readable and computer-executable instructions reside, for example, in data storage features such as computer usable volatile memory 106 and/or computer usable non-volatile memory 108 of FIG. 1. The computer-readable and computer-executable instructions are used to control or operate in conjunction with, for example, central processing unit 104 of FIG. 1, host operating system 200, and network device driver 210 both of FIG. 2. Although specific steps are disclosed in flow chart 300 of FIG. 3, such steps are exemplary. That is, the present invention is well suited to performing various other steps or variations of the steps recited in FIG. 3.

In step 302 of FIG. 3, in one embodiment, the present stores selected hash values in memory. In one embodiment peripheral component driver 210 stores the selected hash values in memory 140 or NIC 118. In the following description of embodiments of the present invention, the peripheral component driver is a network interface card driver. Additionally, in the following description of embodiments of the present invention, the peripheral component is a network interface card. Although the present embodiments specifically recite a network interface card and a network interface card driver, the present invention is also well suited to an embodiment employing various other peripheral components and peripheral component drivers. That is, the present invention is well suited to an embodiment in which the peripheral component is, for example, a PCMCIA (personal computer memory card international association) card and the peripheral component driver is a corresponding PCMCIA driver. Similarly, the present invention is well suited to an embodiment in which the peripheral component is, for example, a compact form factor I/O (input/output) card and the peripheral component driver is a corresponding compact form factor I/O driver.

Referring again to step 302 of FIG. 3, as mentioned above, network interface card driver 210 of FIG. 2 is adapted, in one embodiment, to store selected hash values in memory 140 of NIC 118, both of FIG. 1. In one embodiment peripheral component driver 210 employs an IEEE (Institute of Electronics and Electrical Engineers, Inc.) 802.3 32-bit CRC (cyclic redundancy check) approach to pare the 48 bit destination addresses of the desired multicast packets to 32 bits. Hence the present embodiment is able to use an existing CRC scheme often employed in NICs to pare the 48 bit destination addresses of the desired multicast packets to 32 bits. Considering the following generating polynomial:

$$G(x)=x^{32}+x^{26}+x^{23}+x^{22}+x^{16}+x^{12}+x^{11}+x^{10}+x^8+x^7+x^5+x^4+x^2+x+1$$

Mathematically, the CRC value corresponding to a given destination address is defined by the following procedure:

a) The first 32 bits of the frame are complemented.
b) The n bits of the frame are then considered to be the coefficients of a polynomial M(x) of degree n−1. (The first bit of the Destination Address field corresponds to the $x^{(n-1)}$ term and the last bit of the data field corresponds to the $x^0$ term.)

c) M(x) is multiplied by $X^{32}$ and divided by G(x), producing a remainder R(x) of degree <31.

d) The coefficients of R(x) are considered to be a 32-bit sequence.

e) The bit sequence is complemented and the result is the CRC.

The 32 bits of the CRC value are placed in the frame check sequence field so that the $x^{31}$ term is the left most bit of the first octet, and the $x^0$ term is the right most bit of the last octet. (The bits of the CRC are thus transmitted in the order $x^{31}, X^{30}, \ldots x^1, x^0$.). Thus, the present embodiment does not require extensive modifications to existing protocols. Although such an approach is recited in the present embodiment, the present invention is also well suited to the use of various other approaches for paring the 48 bit destination addresses to a lesser number of bits. The present invention is also well suited to an embodiment in which peripheral component driver 210 passes the destination addresses to NIC 118 and NIC 118 performs the CRC and then determines the hash values for the respective desired multicast addresses. In such an embodiment, CPU utilization of host computer 100 is kept to a minimum.

Referring still to step 302, after the CRC, the present embodiment uses the lower 10 bits of the 32-bit CRC to determine the selected hash value corresponding to the destination address of the desired multicast packet. By using 10 bits of the CRC result, the present embodiment provides 1024 unique values which can represent corresponding multicast packet addresses. Thus, the present embodiment is well suited to environments such as Gigabit Ethernet environments where a large number of multicast packets may need to be filtered. That is, the present embodiment increases the quantity of multicast packets which can be designated as desired over conventional approaches, thereby rendering the method and system of the present invention well suited for use in present high-speed, large-bandwidth environments. Furthermore, the present method and system increases the quantity of multicast packets which can be designated as desired over conventional approaches and, by using a 1024 entry hash table, does not consume burdensome amounts of storage space. Although the present embodiment recites using the lower 10 bits of the 32-bit CRC to determine the selected hash value, the present invention is also well suited to an embodiment which uses various others of the 32-bits in the CRC result.

Figure 4:
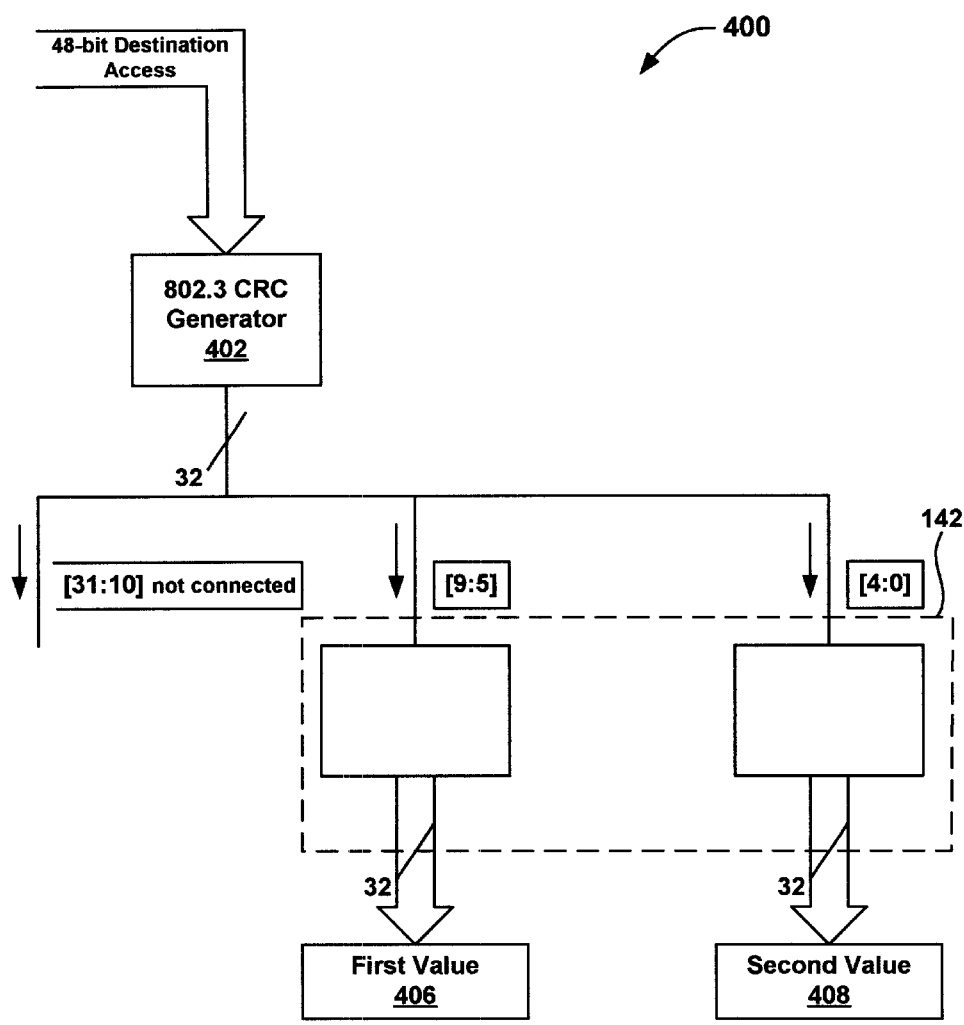
FIG. 4 is a schematic diagram of a cyclic redundancy check system utilized in conjunction with an imperfect filtering of multicast packets method and system in accordance with one embodiment of the present claimed invention.

With reference now to FIG. 4, a schematic diagram 400 of a cyclic redundancy check system is shown. More particularly, as shown in FIG. 4, an 802.3 CRC generator 402 produces a 32-bit result. The lower 10 bits (e.g. bits [4:0] and bits [9:5]) are then fed into hash value generator 142. Hash value generator uses bits [9:5] to compute first value, and bits [4:0] to compute a second value. The use of these values will be described in detail below. In the present embodiment, has value generator 142 is implemented in hardware on NIC 118. More specifically, in the present embodiment, hash value generator 142 is implemented on NIC 118 in hardware as is described by the following Verilog code:

```
input  [9:0]   rg_hash_index;
output         rg_multicast_hash;
reg [31:0]     rx_hash_table_reg_00,
               rx_hash_table_reg_01,
               rx_hash_table_reg_02,
               rx_hash_table_reg_03,
               rx_hash_table_reg_04,
               rx_hash_table_reg_05,
               rx_hash_table_reg_06,
               rx_hash_table_reg_07,
               rx_hash_table_reg_08,
               rx_hash_table_reg_09,
               rx_hash_table_reg_10,
               rx_hash_table_reg_11,
               rx_hash_table_reg_12,
               rx_hash_table_reg_13,
               rx_hash_table_reg_14,
               rx_hash_table_reg_15,
               rx_hash_table_reg_16,
               rx_hash_table_reg_17,
               rx_hash_table_reg_18,
               rx_hash_table_reg_19,
               rx_hash_table_reg_20,
               rx_hash_table_reg_21,
               rx_hash_table_reg_22,
               rx_hash_table_reg_23,
               rx_hash_table_reg_24,
               rx_hash_table_reg_25,
               rx_hash_table_reg_26,
               rx_hash_table_reg_27,
               rx_hash_table_reg_28,
               rx_hash_table_reg_29,
               rx_hash_table_reg_30,
               rx_hash_table_reg_31,
               rx_hash_table_reg_32;
reg            rg_multicast_hash;
reg [31:0]     rx_hash_result;
wire [31:0]    rg_hash_result_index;
wire [31:0]    rx_hash_table_mask;
// This block comb block determines if the bit specified in
rg-hash_index_rclk
// is set in the multicast hash table.
always @ (rx_hash_table_mask or
               rx_hash_table_reg_00 or
               rx_hash_table_reg_01 or
               rx_hash_table_reg_02 or
               rx_hash_table_reg_03 or
               rx_hash_table_reg_04 or
               rx_hash_table_reg_05 or
               rx_hash_table_reg_06 or
               rx_hash_table_reg_07 or
               rx_hash_table_reg_08 or
               rx_hash_table_reg_09 or
               rx_hash_table_reg_10 or
               rx_hash_table_reg_11 or
               rx_hash_table_reg_12 or
               rx_hash_table_reg_13 or
               rx_hash_table_reg_14 or
               rx_hash_table_reg_15 or
               rx_hash_table_reg_16 or
               rx_hash_table_reg_17 or
               rx_hash_table_reg_18 or
               rx_hash_table_reg_19 or
               rx_hash_table_reg_20 or
               rx_hash_table_reg_21 or
               rx_hash_table_reg_22 or
               rx_hash_table_reg_23 or
               rx_hash_table_reg_24 or
               rx_hash_table_reg_25 or
               rx_hash_table_reg_26 or
               rx_hash_table_reg_27 or
               rx_hash_table_reg_28 or
               rx_hash_table_reg_29 or
               rx_hash_table_reg_30 or
               rx_hash_table_reg_31
               )
begin: rgm_is_multicast_hash_comb
    rx_hash_result = 32' hffffffff;
// Here we and the rx_hash_table_mask
(which is the lower five bits
// of the hash index decoded into 32 bit) against
every 32 bit entry
// of the hash table. The results of this and generates a new
// 32-bit value rx_hash_result.
So this means rx_hash_result tells
```

```
                // us if the result of the and operation between
                a particular hash
                // table entry and the mask is true of false.
                // if (( rx_hash_table_reg_00 &
                rx_hash_table_mask) == 0)
                    begin
                        rx_hash_result [0] = 0;
                    end
                if (( rx_hash_table_reg_01 &
                rx_hash_table_mask) = = 0)
                    begin
                        rx_hash_result[1] = 0;
                    end
                if (( rx_hash_table_reg_02 &
                rx_hash_table_mask) = = 0)
                    begin
                        rx_hash_result[2] = 0;
            end
                if (( rx_hash_table_reg_03 &
                rx_hash_table_mask) = = 0)
                    begin
                        rx_hash_result[3] = 0;
            end
                if (( rx_hash_table)reg_04 &
                rx_hash_table_mask) = = 0)
            begin
                        rx_hash_result[4] = 0;
                    end
                if (( rx_hash_table_reg_05 &
                rx_hash_table_mask) = = 0)
                    begin
                        rx_hash_result[5] = 0;
                    end
                if (( rx_hash_table_reg_06 &
                rx_hash_table_mask) = = 0)
                    begin
                        rx_hash_result[6] = 0;
            end
                if (( rx_hash_table_reg_07 &
                rx_hash_table_mask) = = 0)
        begin
            rx_hash_result[7] = 0;
            end
if (( rx_hash_table_reg_08 & rx_hash_table_mask) = = 0)
    begin
        rx_hash_result[8] = 0;
        end
if (( rx_hash table_reg_09 & rx_hash_table_mask) = = 0)
    begin
        rx_hash_result]9] = 0;
        end
if (( rx_hash_table_reg_10 & rx_hash_table_mask) = = 0)
    begin
        rx_hash_result[10] = 0;
        end
if (( rx_hash_table_reg_11 & rx_hash_table_mask) = = 0)
    begin
            rx_hash_result[11] = 0;
    end
if (( rx_hash_table_reg_12 & rx_hash_table_mask) = = 0)
    begin
        rx_hash_result[12] = 0;
        end
if (( rx_hash_table_reg_13 & rx_hash_table_mask) = = 0)
    begin
        rx_hash_result[13] = 0;
        end
            if (( rx_hash_table_reg_14 &
            rx_hash_table_mask) = = 0)
        begin
                rx_hash_result [14] = 0;
            end
if (( rx_hash_table_reg_15 & rx_hash_table_mask) = = 0)
    begin
        rx_hash_result [15] = 0;
        end
if (( rx_hash_table_reg_16 & rx_hash_table_mask) = = 0)
    begin
        rx_hash_result [16] = 0;
            end
        if (( rx_hash table_reg_17 & rx_hash_table_mask) = = 0)
            begin
                rx_hash_result[17] = 0;
                end
                if (( rx_hash_table_reg_18 * & rx_hash_table_mask) = = 0)
                    begin
                        rx_hash_result[18] = 0;
                    end
        if (( rx_hash_table_reg_19 & rx_hash_table_mask) = = 0)
            begin
                rx_hash_result_[19] = 0;
                end
        if (( rx_hash table_reg_20 & rx_hash_table_mask_ = = 0)
            begin
                rx_hash_result[20] = 0;
                end
        if (( rx_hash_table_reg_21 & rx_hash_table_mask) = = 0)
            begin
                rx_hash_result[21] = 0;
                end
                if (( rx_hash_table_reg_22 & rx_hash_table_mask) = = 0)
                    begin
                        rx_hash_result[22] = 0;
                    end
        if (( rx_hash table_reg_23 & rx_hash_table_mask) = = 0)
            begin
                rx_hash_result[23] = 0;
                end
        if (( rx_hash_table_reg_24 & rx_hash_table_mask) = = 0)
            begin
                rx_hash_result [24] = 0;
                end
        if (( rx_hash_table_reg_25 & rx_hash_table_mask) = = 0)
            begin
                rx_hash_result [25] = 0;
                end
        if (( rx_hash_table_reg_26 & rx_hash_table_mask) = = 0)
            begin
                rx_hash_result[26] = 0;
                end
                if (( rx_hash_table_reg_27 & rx_hash_table_mask) = = 0)
                    begin
                        rx_hash_result[27] = 0
                    end
        if (( rx_hash_table_reg_28 & rx_hash_table_mask) = = 0)
            begin
                rx_hash_result [28] = 0;
                end
        if (( rx_hash_table_reg_29 & rx_hash_table_mask) = = 0)
            begin
                rx_hash_result[29] = 0;
                end
                if (( rx_hash_table_reg_30 & rx_hash_table_mask) = = 0)
                    begin
                        rx_hash_result[30] = 0;
                        end
        if (( rx_hash_table_reg_31 & rx_hash_table_mask) = = 0)
            begin
                rx_hash_result[31] = 0;
                end
        end
        always @ (rx_hash_result or rg_hash—result_index)
            begin
            // Here we and the rx_hash_result with the decoded value of the
            // upper five bits or rg_hash_index_rclk.
            If the result ! = 0, then
            // the bit specified by the 10 bit value of rg_hash_index_rclk
            // was set in the multicast table.
            if (( rx_hash_result & rg_hash_result_index_index) ! = 0)
            begin
                rg_multicast_hash = 1;
                end
            else
            begin
                    rg_multicast_hash = 0;
                end
            end
// This is a 5x32 decoder. The output is used as a bit mask.
```

-continued

```
// which is and with the rg_hash_table_reg_[rg_hash_index_rclk[9:5]
// to determine if the packet should be passed up.
rgmDecoder rgmDecoder (
        .rg_encoded_data)rg_hash_index [4:0]),
1       .rg_decoded_data (rx_hash_table_mask)
1       );
1 rgmDecoder rgmHashMux (
1       .rg_encoded)_data (rg_hash_index[9:5]),
        .rg_decoded_data (rg_hash_result_index)
    );
```

Although such a hardware implementation is recited in the present embodiment, the present invention is well suited to various other implementations of hash value generator 142, and to having hash value generator 142 disposed other than on NIC 118.

Figure 5:
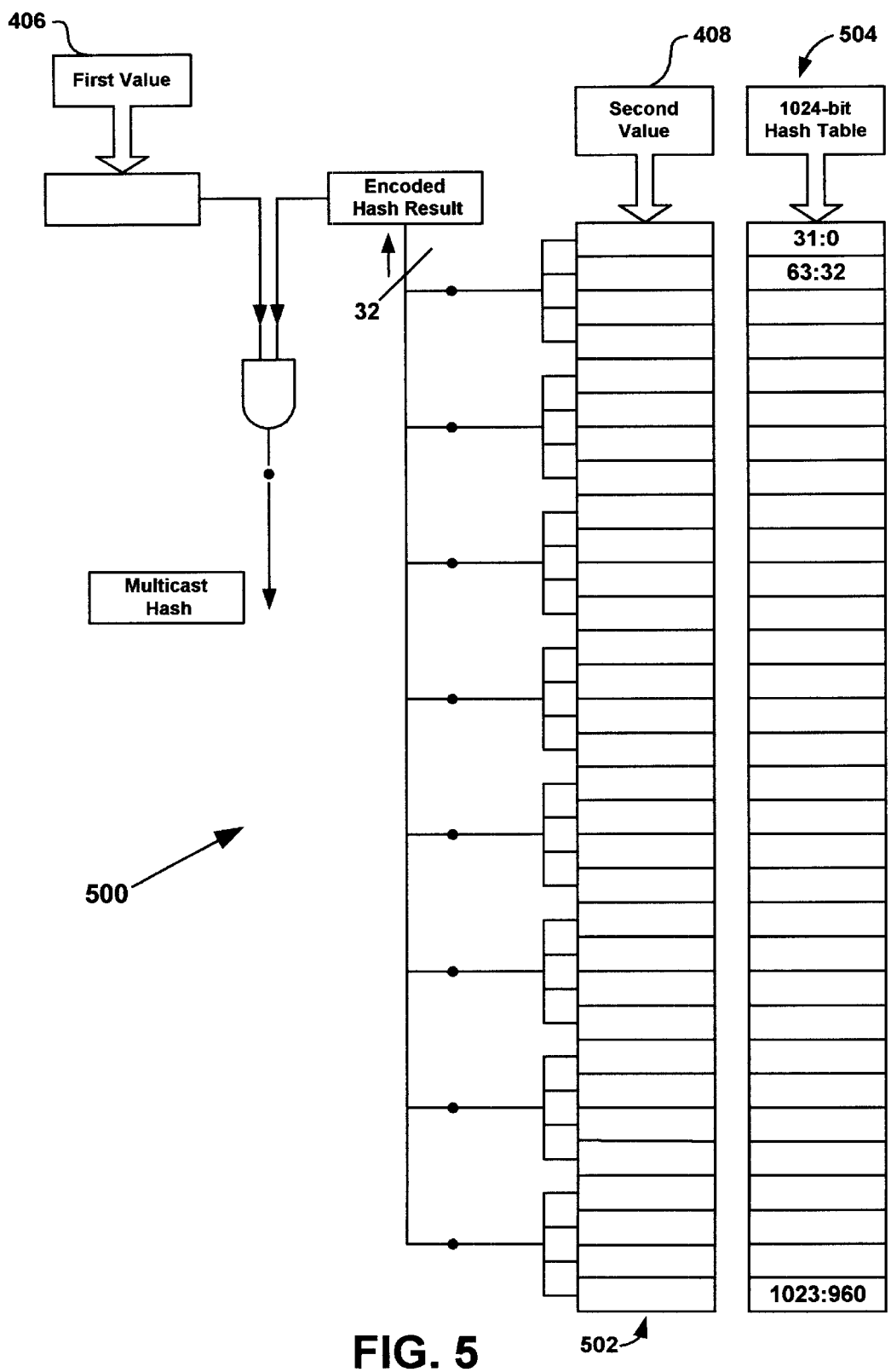
FIG. 5 is a schematic diagram representing hash value storage arrangements used in an imperfect filtering of multicast packets method and system in accordance with one embodiment of the present claimed invention.

With reference now to FIG. 5, a schematic diagram representing hash value storage arrangements used in one embodiment of the imperfect filtering of multicast packets method and system of the present claimed invention is shown. As shown in FIG. 5, first value 406 determined from bits [9:5] of 802.2 CRC generator 402 of FIG. 4 is used to designate one of the 32 rows in hash table 502 for received multicast packets, and in hash table 504 for selected desired multicast packets. Second value 408 determined from bits [4:0] of 802.2 CRC generator 402 of FIG. 4 is used to designate one of the 32 entries per row of hash table 502 for received multicast packets, and in hash table 504 for selected desired multicast packets. The use of the storage arrangements of FIG. 5 will be described below in greater detail in conjunction with the steps of the present embodiment. In one embodiment, hash tables 502 and 504 reside, for example, in memory 140 of NIC 118. The present invention is however, well suited to an embodiment in which hash tables 502 and 504 reside other than in memory 140 of NIC 118.

Referring still to step 302, in the present embodiment, the destination addresses of selected multicast packets are first subjected to a CRC. The lower 10 bits of the CRC result are then fed into a hash value generator to compute the corresponding selected hash value. As an example, if bits [9:5] had a hash value of 30 (assuming base 10) and bits [4:0] had a hash value of 6, table 504 would have a bit set (e.g. a one or high value) for the sixth entry of column 30. Thus, the present embodiment is well suited to providing a hash table (e.g. hash table 504) which stores values corresponding to at least 1024 desired multicast packet destination addresses. It will be understood that in some instances more than one desired multicast packet will generate the same hash value, or an undesired multicast packet may have the same hash value as desired packet. However, in such an instance, the present embodiment will still have the appropriate bit set in hash table 504. Although the present embodiment recites setting a bit high in hash table 504 for a desired multicast packet, the present invention is also well suited to an embodiment in which a bit is set, for example, low in hash table 504 for a desired multicast packet.

Referring now to step 304, upon receiving an incoming multicast packet, the present embodiment uses hash value generator 142 to determine a hash value for the received multicast packet. More specifically, the present embodiment uses a CRC generator 402 to produce a 32-bit result from the 48-bit destination address of the received multicast packet. The lower 10 bits (e.g. bits [4:0] and bits [9:5]) are then fed into hash value generator 142. Hash value generator uses bits [9:5] to compute first value, and bits [4:0] to compute a second value. First value 406 determined from bits [9:5] of 802.2 CRC generator 402 of FIG. 4 is used to designate one of the 32 rows in hash table 502. Second value 408 determined from bits [4:0] of 802.2 CRC generator 402 of FIG. 4 is used to designate one of the 32 entries per row of hash table 502.

At step 306, the present embodiment then compares the hash value for the received multicast packet with the selected hash values in table 504 corresponding to desired multicast packets. That is, determining the hash value for the received multicast packet, the present embodiment examines hash table 504 to see if the same hash value is present (i.e. is a bit set for the same entry in the same row). If the received multicast packet has the same destination address as a desired multicast packet (i.e. the same hash value is present in hash table 504), the present embodiment proceeds to step 308. If the received multicast packet does not have the same destination address as a desired multicast packet (i.e. the same hash value is not present in hash table 504), the present embodiment proceeds to step 310.

At step 308, if the received multicast packet has the same destination address as a desired multicast packet (i.e. the same hash value that was determined for the received multicast packet is present in hash table 504), the present embodiment forwards the multicast packet from NIC 118 to host computer 100.

At step 310, if the received multicast packet does not have the same destination address as a desired multicast packet (i.e. the same hash value that was determined for the received multicast packet is not present in hash table 504), the present embodiment discards the multicast packet from NIC 118. That is, NIC 118 discards the received multicast packet without interrupting host computer 100. Because NIC 118 is able to discard unwanted multicast packets before the multicast packets ever reach host computer 100, the present invention does not require the extensive host computer intervention associated with conventional approaches wherein the host computer must evaluate its desire for received multicast packets.

Thus, the present invention provides a method and system for filtering multicast packets wherein the method and system does not consume burdensome amounts of storage space. The present invention further provides a method and system for filtering multicast packets wherein the method and system achieves the above-listed accomplishment and wherein the method and system does not require extensive host computer intervention. The present invention also provides a method and system for filtering multicast packets wherein the method and system achieves the above-listed accomplishments and wherein the method and system does not require extensive modifications to underlying peripheral component driver protocols.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications suited to the particular use contemplated. It is intended that the scope of the invention be defined by the claims appended hereto and their equivalents.

What is claimed is:

1. A system for filtering multicast packets by a peripheral component, said system comprising:

a host computer, said host computer adapted to operate a peripheral component driver, said peripheral component driver adapted to store in memory a selected hash value corresponding to a desired multicast packet; and a peripheral component adapted to be removably coupled to said host computer, said peripheral component including a hash value generator, said hash value generator adapted to determine a hash value for a received multicast packet, said peripheral component further adapted to compare said hash value for said received multicast packet with said selected hash value stored in said memory, said peripheral component further adapted to discard said received multicast packet without interrupting said host computer when said hash value for said received multicast packet does not match said selected hash value stored in said memory.

2. The system for filtering multicast packets by a peripheral component as recited in claim 1 wherein said peripheral component is a network interface card.

3. The system for filtering multicast packets by a peripheral component as recited in claim 2 wherein said peripheral component driver is a network interface card driver.

4. The system for filtering multicast packets by a peripheral component as recited in claim 1 wherein hash value generator produces a 10 bit hash value.

5. The system for filtering multicast packets by a peripheral component as recited in claim 1 wherein hash value generator is implemented in hardware on said peripheral component.

6. The system for filtering multicast packets by a peripheral component as recited in claim 1 wherein memory is disposed on said peripheral component.

7. The system for filtering multicast packets by a peripheral component as recited in claim 1 wherein said peripheral component driver is adapted to store in said memory 1024 selected hash values corresponding to at least 1024 desired multicast packets.

8. A method for filtering multicast packets by a peripheral component, said method comprising the steps of:

a) using a peripheral component driver to store in memory a selected hash value corresponding to a desired multicast packet;

b) using a hash value generator disposed on a peripheral component to determine a hash value for a received multicast packet;

c) comparing said hash value for said received multicast packet with said selected hash value stored in said memory; and d) provided said hash value for said received multicast packet does not match said selected hash value stored in said memory, discarding said received multicast packet without interrupting a host computer to which said peripheral component is adapted to be coupled.

9. The method for filtering multicast packets by a peripheral component as recited in claim 8 wherein step a) comprises using said peripheral component driver to store in memory located on said peripheral component said selected hash value corresponding to said desired multicast packet.

10. The method for filtering multicast packets by a peripheral component as recited in claim 8 wherein step a) comprises using a network interface card driver to store in said memory said selected hash value corresponding to said desired multicast packet.

11. The method for filtering multicast packets by a peripheral component as recited in claim 8 wherein step a) comprises using said peripheral component driver to store in said memory 1024 selected hash values corresponding to at least 1024 desired multicast packets.

12. The method for filtering multicast packets by a peripheral component as recited in claim 10 wherein step b) comprises using said hash value generator disposed on a network interface card to determine said hash value for said received multicast packet.

13. The method for filtering multicast packets by a peripheral component as recited in claim 8 wherein step b) comprises using said hash value generator disposed on said peripheral component to produce a 10 bit hash value for said received multicast packet.

14. The method for filtering multicast packets by a peripheral component as recited in claim 8 wherein step b) comprises using said hash value generator implemented in hardware on said peripheral component to determine said hash value for said received multicast packet.

15. A method for filtering multicast packets by a network interface card, said method comprising the steps of:

a) using a network interface card driver to store in memory a selected hash value corresponding to a desired multicast packet;

b) using a hash value generator disposed on a network interface card to determine a hash value for a received multicast packet;

c) comparing said hash value for said received multicast packet with said selected hash value stored in said memory; and d) provided said hash value for said received multicast packet does not match said selected hash value stored in said memory, discarding said received multicast packet without interrupting a host computer to which said network interface card is adapted to be coupled.

16. The method for filtering multicast packets by a network interface card as recited in claim 15 wherein step a) comprises using said network interface card driver to store in memory located on said network interface card said selected hash value corresponding to said desired multicast packet.

17. The method for filtering multicast packets by a network interface card as recited in claim 15 wherein step a) comprises using said network interface card to store in said memory 1024 selected hash values corresponding to at least 1024 desired multicast packets.

18. The method for filtering multicast packets by a network interface card as recited in claim 15 wherein step b) comprises using said hash value generator disposed on said network interface card to produce a 10 bit hash value for said received multicast packet.

19. The method for filtering multicast packets by a peripheral component as recited in claim 15 wherein step b) comprises using said hash value generator implemented in hardware on said network interface card to determine said hash value for said received multicast packet.

* * * * *